(12) United States Patent
Nguyen

(10) Patent No.: US 12,003,666 B2
(45) Date of Patent: Jun. 4, 2024

(54) BLOCKING UNWANTED COMMUNICATIONS OVER TELEPHONY AND MESSAGING SERVICES

(71) Applicant: Zoom Video Communications, Inc., San Jose, CA (US)

(72) Inventor: Thanh Le Nguyen, Belle Chasse, LA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/847,656

(22) Filed: Jun. 23, 2022

(65) Prior Publication Data

US 2023/0421692 A1    Dec. 28, 2023

(51) Int. Cl.
*H04M 3/436* (2006.01)

(52) U.S. Cl.
CPC .................. *H04M 3/436* (2013.01)

(58) Field of Classification Search
CPC .................................... H04M 3/426
USPC .................................... 379/142.05
See application file for complete search history.

(56) References Cited

U.S. PATENT DOCUMENTS

| 7,730,145 B1 | 6/2010 | Frenkel et al. |
| 7,945,952 B1 | 5/2011 | Behforooz |
| 9,060,057 B1 | 6/2015 | Danis |
| 9,241,245 B2 | 1/2016 | Lou et al. |
| 9,350,858 B1 | 5/2016 | Roths |
| 9,699,305 B1 * | 7/2017 | Compert ............... H04M 3/436 |
| 9,819,797 B2 | 11/2017 | Sharpe |
| 10,242,207 B2 * | 3/2019 | Cunico ................ G06F 21/604 |
| 10,389,872 B1 * | 8/2019 | Cox ...................... H04M 3/382 |
| 10,523,814 B1 * | 12/2019 | Moore .................. H04M 3/493 |
| 10,554,821 B1 | 2/2020 | Koster |
| 10,834,611 B1 * | 11/2020 | Sivaramalingam ... H04M 3/487 |
| 11,095,772 B2 | 8/2021 | Sial et al. |
| 11,102,244 B1 * | 8/2021 | Jakobsson ............... H04L 51/42 |
| 11,108,908 B1 * | 8/2021 | Candelore ......... H04M 3/42042 |
| 11,757,914 B1 * | 9/2023 | Jakobsson .............. H04L 51/42 726/25 |
| 2005/0081032 A1 * | 4/2005 | Struik ..................... H04L 63/04 713/166 |
| 2005/0198173 A1 | 9/2005 | Evans |

(Continued)

OTHER PUBLICATIONS

Battling Robocallers—a Tutorial on STIR/SHAKEN with Alan Percy—YouTube, https://www.youtube.com/watch?v=W25a3I0gWp8&t=2095s, Oct. 30, 2018, 3 pages.

(Continued)

*Primary Examiner* — Binh Kien Tieu
(74) *Attorney, Agent, or Firm* — Young Basile Hanlon & MacFarlane, P.C.

(57) ABSTRACT

A communication is received from a telephone number of a sender. The communication is directed to a recipient. A trust level associated with the telephone number is determined to be other than a high trust level. Based on the trust level being other than the high trust level, a number of challenges to transmit to the sender is determined based on the trust level. Determining whether to route the communication to the recipient is based on whether respective successful responses to the challenges are received from the sender.

20 Claims, 9 Drawing Sheets

(56) References Cited

U.S. PATENT DOCUMENTS

| | | | |
|---|---|---|---|
| 2008/0155644 A1* | 6/2008 | Baranov | H04W 12/108 726/1 |
| 2010/0317319 A1* | 12/2010 | Gorman | H04M 3/42382 455/410 |
| 2010/0319063 A1* | 12/2010 | Koppolu | H04L 65/1104 709/227 |
| 2012/0204265 A1* | 8/2012 | Judge | H04L 63/145 726/22 |
| 2012/0284026 A1* | 11/2012 | Cardillo | G10L 17/08 704/E17.001 |
| 2013/0080242 A1* | 3/2013 | Alhadeff | G06F 16/957 705/14.39 |
| 2014/0192965 A1* | 7/2014 | Almeida | H04M 3/2281 379/70 |
| 2017/0026404 A1 | 1/2017 | Peeler | |
| 2018/0255177 A1 | 9/2018 | Scott | |
| 2018/0324299 A1 | 11/2018 | Sial et al. | |
| 2019/0074000 A1 | 3/2019 | Park et al. | |
| 2019/0174000 A1 | 6/2019 | Bharrat et al. | |
| 2019/0394331 A1 | 12/2019 | Benlolo et al. | |
| 2020/0396615 A1 | 12/2020 | Gordon et al. | |
| 2021/0037135 A1* | 2/2021 | Meredith | H04M 3/4365 |
| 2022/0014543 A1* | 1/2022 | Jakobsson | H04L 63/123 |
| 2022/0217233 A1* | 7/2022 | Geroe | H04M 15/8083 |
| 2022/0377172 A1 | 11/2022 | Garg et al. | |

OTHER PUBLICATIONS

The FCC Wants Scammers to Stop Calling You—CNET, https://www.cnet.com/tech/mobile/the-fcc-wants-scammers-to-stop-calling-you/, Marguerite Reardon, May 23, 2022, 7 pages.

Stir/Shaken—Wikipedia, https://en.wikipedia.org/wiki/STIR/SHAKEN, Mar. 25, 2022, 8 pages.

* cited by examiner

BLOCKING UNWANTED COMMUNICATIONS OVER TELEPHONY AND MESSAGING SERVICES

FIELD

This disclosure relates generally to communication handling and more specifically to determining whether to block communications that are unwanted from reaching intended recipients or whether to route the communications to the intended recipients.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
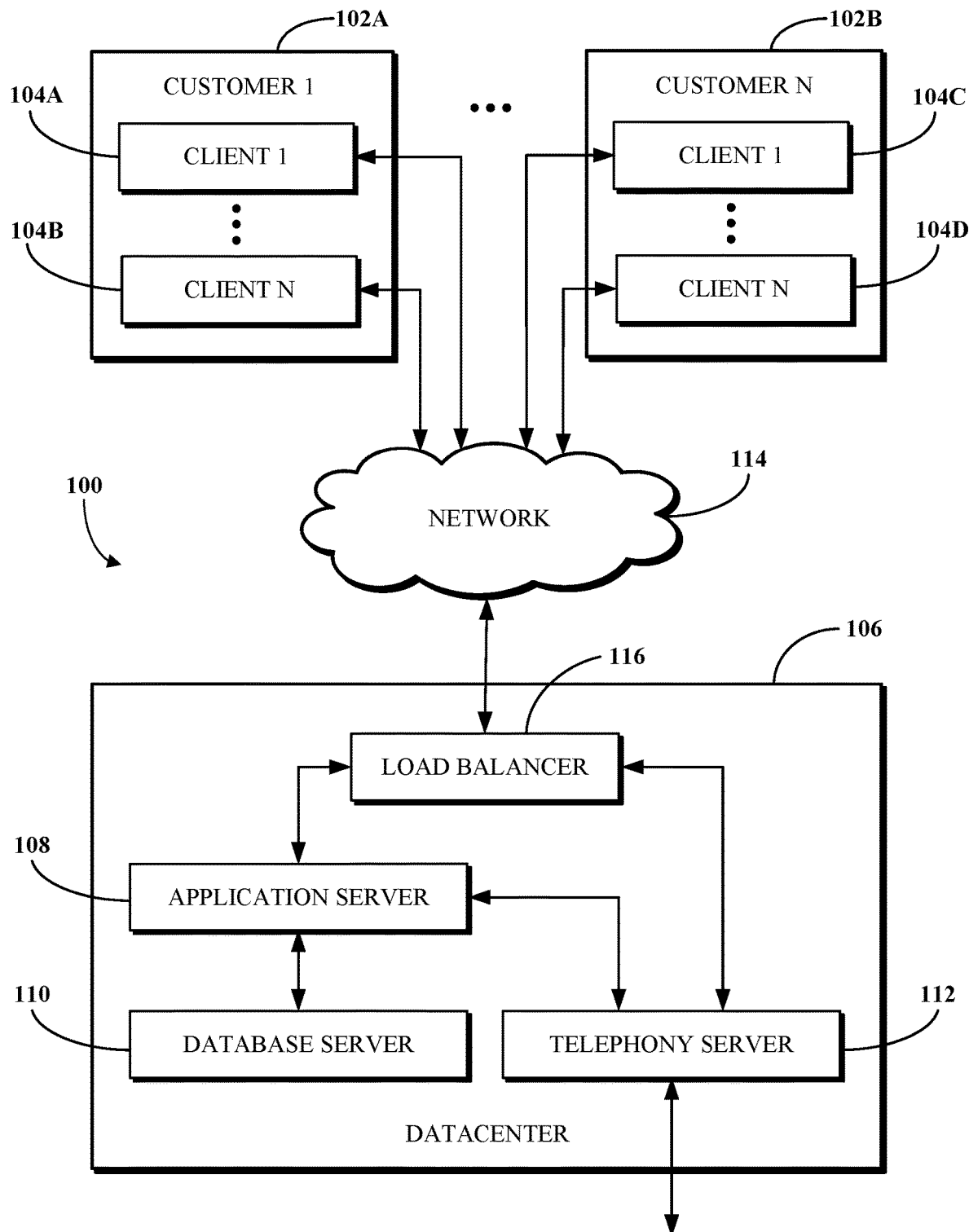
FIG. 1 is a block diagram of an example of an electronic computing and communications system.

Advancements in communication technologies, such as voice over internet protocol (VOIP) and other internet-based technologies and technologies that enable messaging, have led to the proliferation of unwanted communications, including fraudulent and unsolicited communications, and communications from unknown or spoofed telephone numbers. Such unwanted communications may be initiated by automated systems that are capable of simultaneously initiating many communications to many target recipients with the intent of having at least some of the target recipients engage with (e.g., respond to) requests included in such communications. A target recipient may in some cases receive many unwanted communications daily.

Unwanted telephonic communications are referred to herein as unwanted calls; and unwanted text communications are referred to herein as unwanted texts. A text communication refers to communications sent using the Short Message Service (SMS), the Multimedia Messaging Service (MMS), or the like. As used herein, an unwanted sender is the initiator of one or more unwanted communications. An unwanted sender of unwanted calls may be referred to as unwanted caller. An intended recipient of an unwanted communication may also be referred to herein as, simply, a recipient. That a communication is directed to (e.g., intended for) a recipient can mean that the communication is directed to a telephone number (i.e., referred to herein as "recipient telephone number") associated with the recipient. A recipient of a telephonic communication may additionally be referred to herein as a callee. A telephone number may be associated with a communication. Such telephone number is referred to herein as a "telephone number of the communication." That a communication is received from a telephone number of the communication can include that a header associated with the communication can be used to identify at least the telephone number of the communication. For example, a text message may be associated with an MMS header that includes sender information. As another example, a telephone call may include a session initiation protocol (SIP) header that includes the telephone number of the sender.

Several strategies have been deployed in attempts to thwart or at least reduce unwanted communications.

The National Do-Not-Call Registry maintained by the United States federal government is an implementation of such as strategy. The Registry is a database that includes the telephone numbers of individuals and families who have requested that telemarketers not contact them. However, at least some unwanted senders continue to ignore the registry.

Crowd-sourced do-not-answer lists are another such strategy. A crowd-sourced do-not-answer list, which may be deployed by a service provider, enables receivers (e.g., callees) of unwanted communications to add the source of an unwanted communication to the do-not-answer list. The service provider may block communications from telephone numbers included in the crowd-sourced do-not-answer list from reaching the intended recipients. However, since unwanted communications are made using spoofed or fake telephone numbers, crowd-sourced do-not-answer lists may end up including telephone numbers (i.e., the spoofed telephone numbers) that should not be blocked while not blocking the actual telephone numbers used by the senders of the unwanted communications. Spoofing refers to the technique used by unwanted senders to disguise their identities by deliberately falsifying the caller identification (caller ID) transmitted to recipients (including callees) and displayed at devices of to the recipients.

Secure Telephony Identity Revisited/Signature-based Handling of Asserted information using toKENs (STIR/SHAKEN) is a suite of protocols and procedures that can be deployed to ensure that calls traveling through telephone networks have their caller ID signed as legitimate by originating carriers and validated by other carriers before the calls are received at the devices of the callees. An originating carrier signs a telephone call by adding a digital certificate that indicates a level of attestation of the telephone number associated with the telephone call. The digital certificate can be included in a call setup message, which in the VOIP environment may be a SIP INVITE message. At the terminating service provider, the digital certificate is examined in accordance with the STIR/SHAKEN procedures. Various procedures or services may be offered to the callee based on the level of attestation. For example, if the level of attestation indicates that the caller owns the telephone number (i.e., Attestation="A"), then a check mark may be displayed at a device of the callee indicating that telephone number included in the SIP header is owned by the caller. However, STIR/SHAKEN does not stop unwanted calls from reaching callees and cannot judge the merits of calls (whether calls are unwanted to not).

The strategies described above do not successfully stop unwanted communications from reaching recipients. Additionally, communication platforms used by recipients may rely on verification of senders by originating carriers and may not play more active roles in stopping unwanted communications. For example, this may be because such communications platforms may not include capabilities that can or can be used to stop, or at least limit, unwanted communications.

Implementations of this disclosure address problems such as these by issuing one or more challenges to a sender of a communication in the case that the telephone number of the communication is not associated with, or considered to have, a high trust level. As mentioned above, senders of unwanted communications may use automated systems that may not be capable of anticipating, let alone responding to, challenges. To illustrate, a robo caller (i.e., a system that automatically initiates mass communications on behalf of human callers) may be configured to wait (e.g., listen) for an initial connection with a recipient and to transfer the call to a human agent when the connection is made. The robo caller may be configured to listen for keywords, such as "hello." However, such systems are not capable or are not equipped to receive and respond to challenges.

Various trust levels may be used by the implementations of this disclosure. The number of challenges transmitted to the sender may depend on the trust level. For example, if a medium trust level is associated with a sender, then one challenge may be transmitted to the sender; and if a low trust level is associated with a sender, then at least two challenges may be transmitted to the sender. If the sender successfully answers the challenges, then the communication may be routed to the intended recipient. Transmitting a challenge to the sender includes transmitting the challenge to the telephone number of the communication, which in turn can include transmitting the challenge to a device from which the communication is initiated. In an example, the communication may include an Internet Protocol (IP) address of the device from which the communication initiated. As such, transmitting the challenge to the sender can include addressing the challenge to a device associated with the IP address.

In some implementations, a sender (i.e., a telephone number of a communication received from the sender) may be or may be considered to be associated with a high trust level. As further described below, the high trust level may be implied for, and may not be explicitly assigned to or associated with, the telephone number. Such situations include, for example, those in which the telephone number is included in a contact list of the receiver, the telephone number is included in a global white list, and/or the telephone number is verified.

In some implementations, a global challenge list of telephone numbers can be built. The global challenge list includes telephone numbers of at least some of the senders that do not successfully answer challenges. If a later communication is received from a telephone number included in the global challenge list and the sender does not successfully respond to a challenge, the trust level of (e.g., associated with) the phone number may be decreased further. In some implementations, communications from telephone numbers included in the global challenge list may be temporarily or permanently banned, thus preventing communications received from such banned telephone numbers from being routed to the intended recipient. Other aspects of blocking unwanted communications are further described herein.

To describe some implementations in greater detail, reference is first made to examples of hardware and software structures used to implement blocking of unwanted communications. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a SIP zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
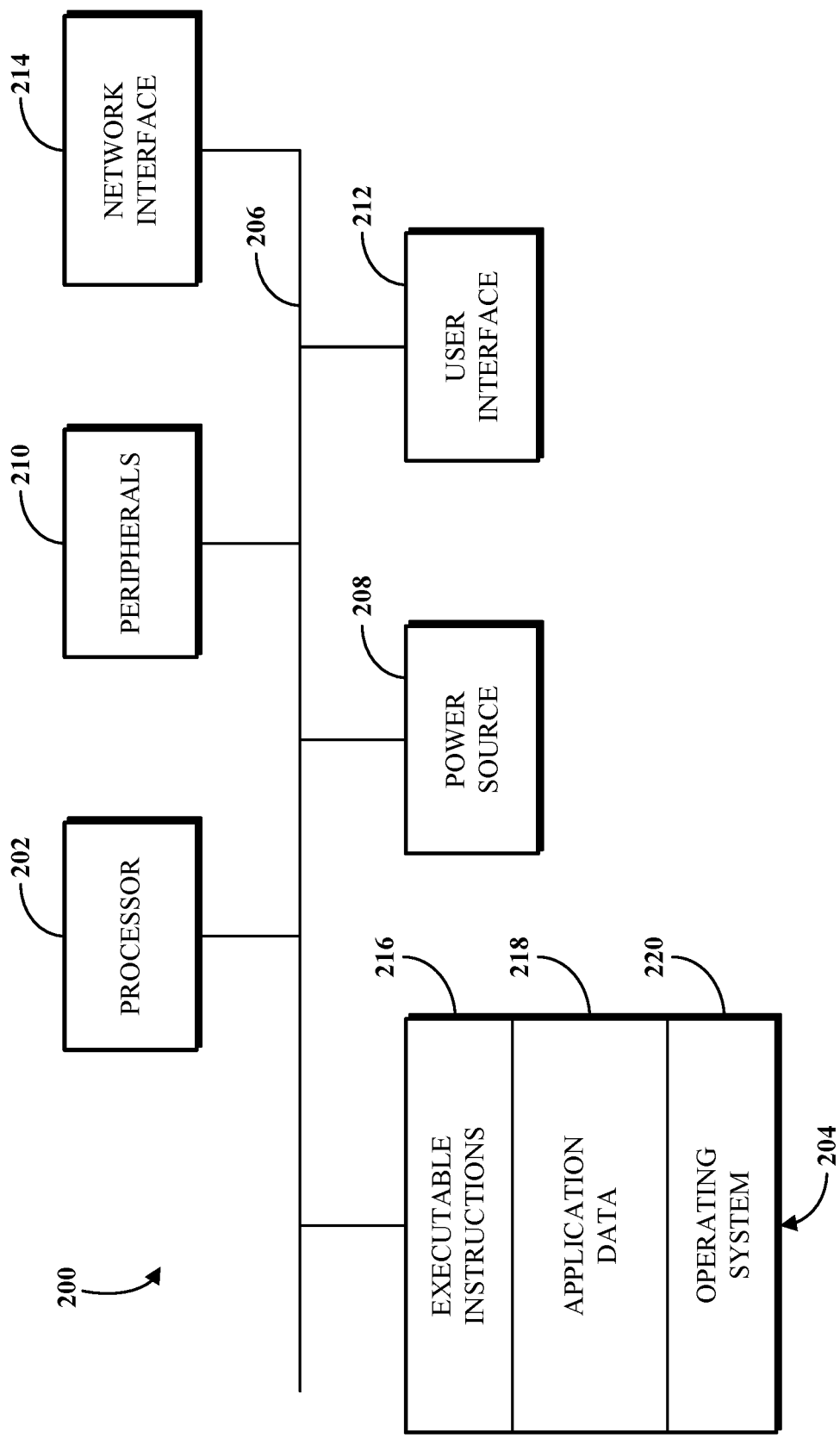
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), IP, power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
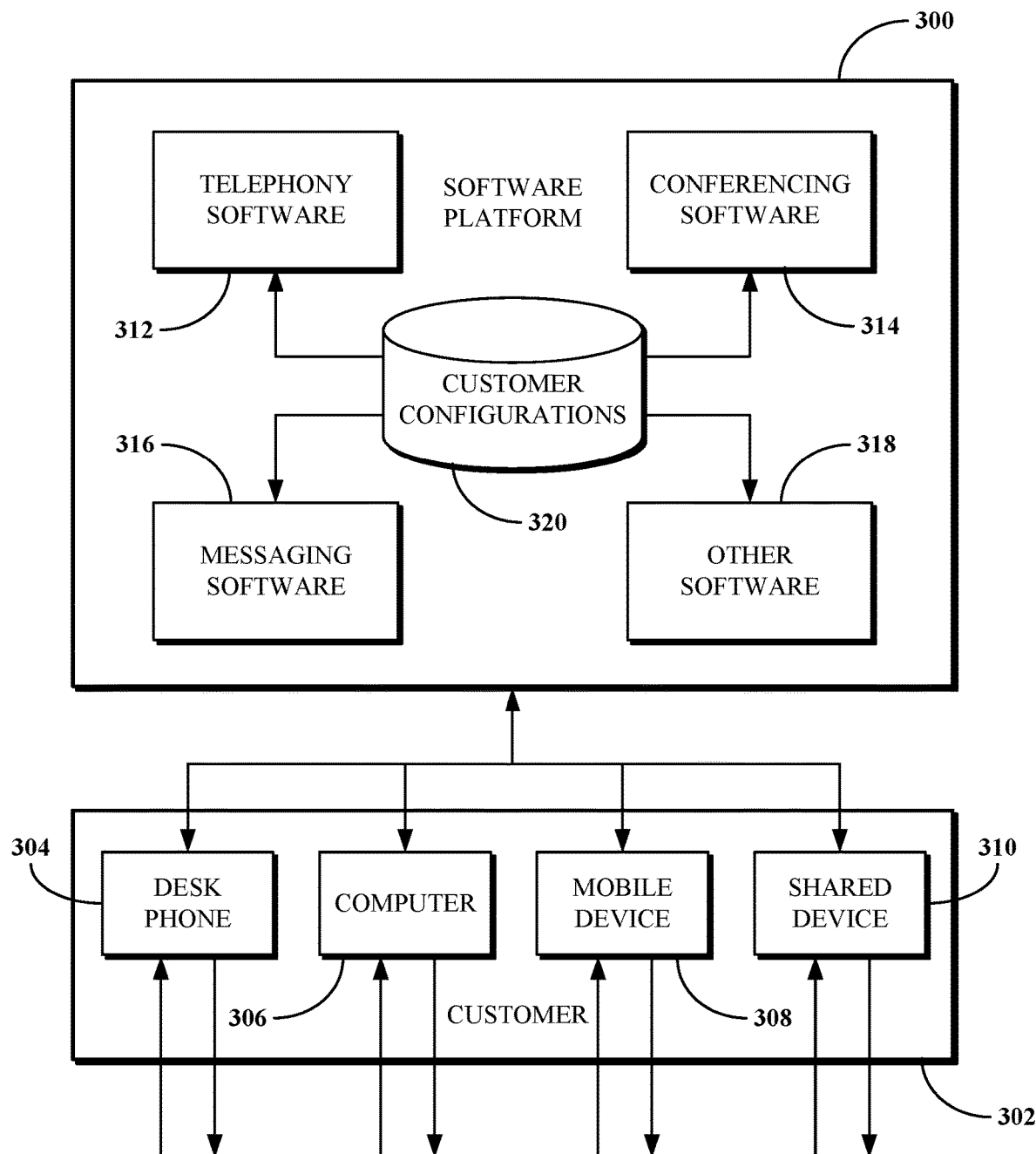
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include blocking software for blocking unwanted communications. In some such cases, the other software 318 may be included in or otherwise used with one or both of the telephony software 312 or the messaging software 316.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4A:
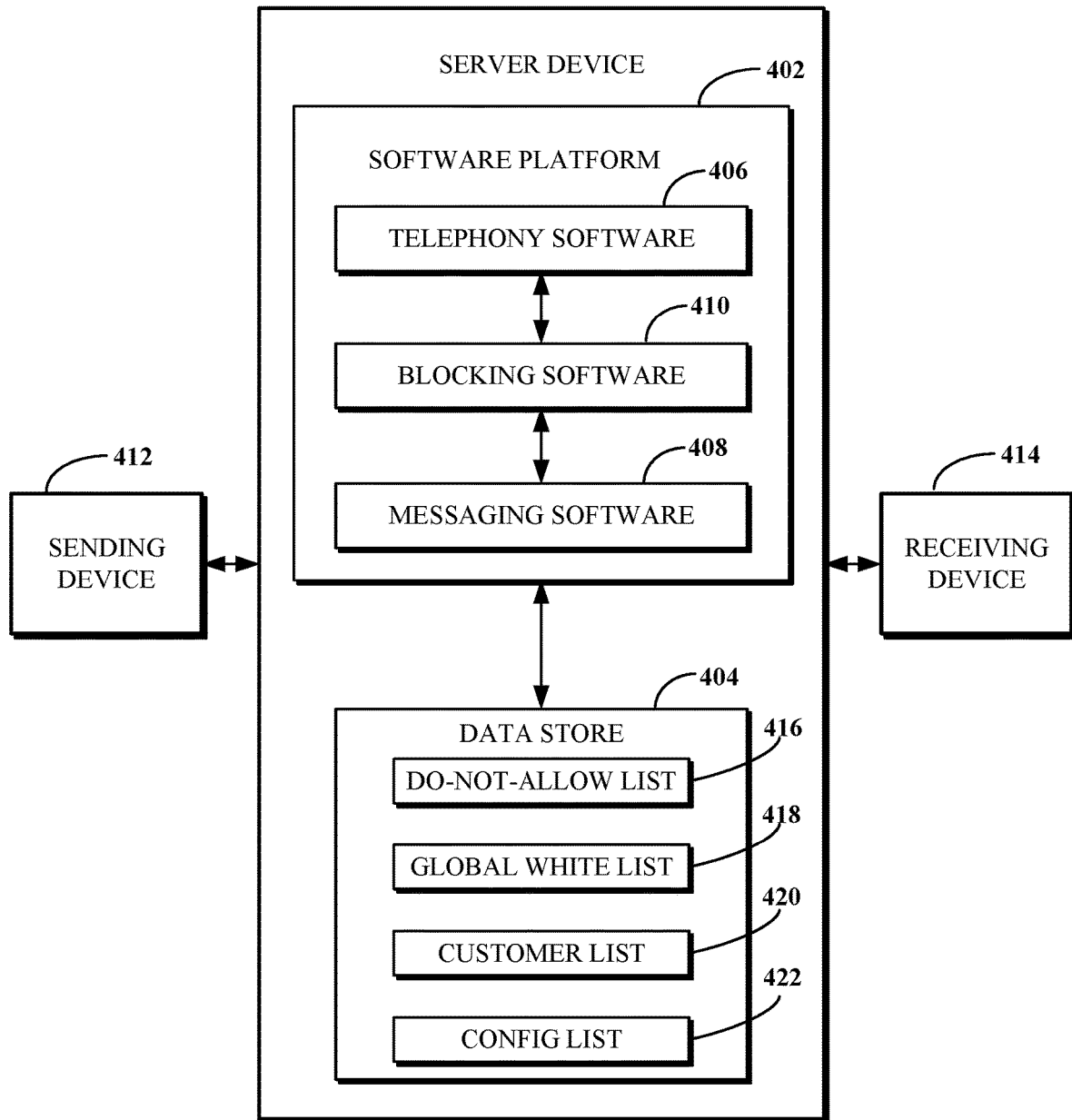
FIG. 4A is a block diagram of an example of a server used for blocking unwanted communications.

FIG. 4A is a block diagram of an example of a server used for blocking unwanted communications. Blocking unwanted communications includes blocking unwanted communications over telephony services, over messaging services, or both. Blocking communications over messaging services includes blocking unwanted communications that are received via text modalities. The server device 400 may receive communications from one or more sending devices, such as a sending device 412. The communications may be intended to respective receiving devices, such as the receiving device 414. The receiving device 414 can be one of or as described with respect to one of the clients 304 through 310 of FIG. 3. That the communication is intended to a device can mean that the communication is intended for a recipient telephone number that is associated with the device.

As shown, the server device 400 implements or includes a software platform 402 and a data store 404. The server device 400 can be one or more servers implemented by or included in a datacenter, such as the datacenter 106 of FIG. 1. The software platform 402 is shown as including telephony software 406, messaging software 408, and blocking software 410. In some implementations, the telephony software 406 may include the blocking software 410, the messaging software 408 may include the blocking software 410, or each of the telephony software 406 and the messaging software 408 may include at least some tools (described below) of the blocking software 410. The software platform 402 can be or can be similar to the software platform 300 of FIG. 3; the telephony software 406 can be or can be similar to the telephony software 312 of FIG. 3; and the messaging software 408 can be or can be similar to the messaging software 316 of FIG. 3.

The server device 400 may receive a communication from the sending device 412 that is intended for the receiving device 414. That a communication is received from the sending device 412 can mean that the communication includes a telephone number that the communication may indicate to be associated with the sending device 412. In an example, a communication may initially be received by one of the telephony software 406 or the messaging software 408. The communication can be provided to (e.g., passed to or otherwise handed off to) the blocking software 410, which handles (e.g., processes) the communication as described herein. In another example, a communication may initially be received by the blocking software 410. If the blocking software 410 determines that the communication is to be routed to the intended recipient, then the blocking software 410 passes the communication to one of the telephony software 406 or the messaging software 408, as the case may be. That the communication is intended for the receiving device 414 can include that the communication is intended for a telephone number associated with the receiving device 414.

The server device 400 (i.e., the blocking software 410 therein) determines whether to route a communication to the receiving device 414, whether to block the communication, or whether to issue one or more challenges to the sending device 412. The server device 400 may make the determination based at least in part on data included in the data store 404. That the communication is blocked includes that the communication is not routed to the receiving device 414. The communication may be blocked because the blocking software 410 determines that the communication is unwanted. Blocking (i.e., not routing) an unwanted call may cause a telephone connection to not be established between the sending device 412 and the receiving device 414. Blocking (i.e., not routing) an unwanted text can include that the text is not delivered to the receiving device 414.

The data store 404 can be included in or otherwise implemented by a database server, such as the database server 110 of FIG. 1. In an example, the data store 404 or the contents thereof can be included in the customer configurations 320 of FIG. 3. In an example, the customer configurations 320 of FIG. 3 can include the data store 404. The data store 404 is shown as including a do-not-allow list 416, a global white list 418, a customer list 420, and user configuration list 422.

The do-not-allow list 416 includes a list of telephone numbers communications from which are either not routed to intended receiving telephone numbers or are to be challenged to determine, based on responses to challenges, whether to route the communications to the intended telephone numbers. A telephone number included in the do-not-allow list 416 may have associated data, such as described with respect to FIG. 4B.

Figure 4B:
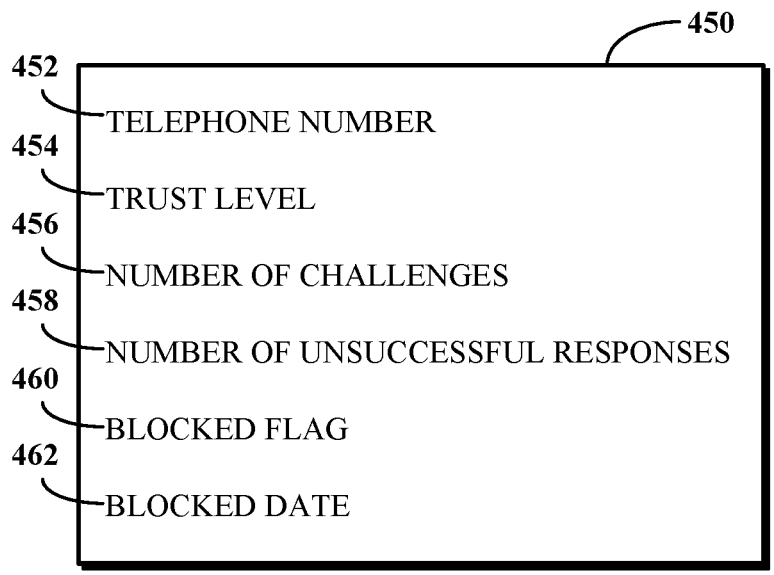
FIG. 4B is an example of data of a do-not-allow list.

FIG. 4B is an example of data of a do-not-allow list, such as the do-not-allow list 416 of FIG. 4A. The do-not-allow list may include one or more records (e.g., data structures) for a telephone number trust level. Records may include fields (e.g., attributes), such as the fields 450. The fields 450 is shown as including a telephone number 452, a trust level 454, a number of challenges 456, a number of unsuccessful responses 458, a blocked flag 460, and a blocked date 462. However, more, fewer, or other fields are possible.

The trust level 454 may be selected from a set of trust levels. In an example, the trust level 454 can be one of a medium trust level or a low trust level. However, other trust levels are possible. The medium trust level may be associated with a verified real person or entity. For example, the telephonic communication received according to the STIR/SHAKEN protocol from a sender may include (such as in SIP header) an attestation level (described below). According to the STIR/SHAKEN protocol, the attestation level may be one of full attestation (i.e., "A"), partial attestation (i.e., "B"), or gateway attestation (i.e., "C"). In an example, the medium trust level may be associated with the attestation levels A and B, and the low trust level may be associated with the attestation level C. In another example, the medium trust level may be associated with the attestation level A, and the low trust level may be associated with the attestation levels B and C.

Full attestation (i.e., "A") indicates that the originating service provider attests that it is responsible for originating the telephone call, that it has an authenticated relationship with the entity making the telephone call, and that it has established a verified association between the telephone number used for the telephone call and the entity. Partial attestation (i.e., "B") indicates that the originating service provider attests that it is responsible for originating the telephone call and that it has an authenticated relationship with the entity making the telephone call (but not with the particular telephone number). Gateway attestation indicates that the originating service provider attests that it has placed the telephone call on its network, but it has no relationship with the entity originating the telephone call.

The number of challenges 456 indicates the number of times that the sender is to be challenged when a communication is received from the telephone number. The blocking software 410 transmits (such as sequentially or one after the other) the challenges to the sender. To illustrate, assume that the number of challenges is 2. As such, the blocking software 410 transmits the first challenge and waits for a successful response. If a successful response is received, the blocking software 410 transmits the second challenge and waits for a successful response to the second challenge.

Challenging the sender means to transmit a prompt that requires a response from the sender. To illustrate, examples of challenges may be "what are the last 2 digits of the telephone number you are calling from," "what is the current year," or "what is 2+2." A successful response is a correct response that is received within a response time window (e.g., 5 or 10 seconds). While not specifically shown, the blocking software 410 may include or have access to a set of challenges from which it may randomly select.

The number of unsuccessful responses 458 indicates the number of times that successful responses were not received from the sender for communications received from the sender. To illustrate, assume that the number of challenges is 1 and that a first communication is received from the sender. If the sender does not successfully respond to the challenge transmitted responsive to receiving the first communication, then the number of unsuccessful responses 458 would be incremented by one. Assume further that at a later time, a second communication is received from the sender (i.e., the telephone number 452). If the sender does not successfully respond to the challenge transmitted responsive to the second communication, then the number of unsuccessful responses 458 is again incremented by one.

The blocked flag 460, if set to a first value (e.g., true or 1), indicates that communications received from the telephone number 452 at the software platform 402 are considered unwanted and, as such, are not routed to the intended recipient. If a telephone number 452 is considered blocked, then no challenges are issued to the sender in response to a received communication from the sender. Rather, the communications are merely dropped (e.g., ignored). As further described below, the telephone number 452 may be temporarily or permanently blocked. In an example, the duration of blockage may depend on the number of unsuccessful responses 458. As such, the telephone number may be progressively blocked (i.e., the duration of blockage may be increased) leading to permanent blockage.

The blocked date 462 indicates the date that the blocked flag 460 was set to the first value. The blocking software 410 uses the blocked date 462 to determine when to unblock the telephone number 452, if at all. If the sender does not successfully respond to challenges for a predetermined number of failures (e.g., 5) since the telephone number 452 was unblocked, then the blocking software 410 blocks the telephone number 452 for a blocking period (e.g., 30 days). If the number of unsuccessful responses reaches a maximum number of failures (e.g., 10 or 15), then the blocking software 410 does not unblock the telephone number 452. That is, the telephone number 452 can be considered to be permanently blocked.

The global white list 418 includes contact lists from one or more users of the software platform 402. In an example, a user of the software platform 402 may be specifically a user of (e.g., is enabled or authorized to use) at least one of the telephony software 406 or the messaging software 408. As such, users can be potential or intended recipients of communications. As users of the software platform 402 may be recipients of communications, the users are referred to as potential recipients.

A contact included in the global white list 418 is referred to herein as an "allowed contact." A telephone number of an allowed contact is referred to as an "allowed telephone number." The blocking software 410 may provide facilities (e.g., functions, tools, and user interfaces) that enable a user to include at least a subset of their contacts in the global white list 418. The contact list of a user may include telephone numbers that the user considers to be trusted or known to be valid (e.g., verified) telephone numbers. A user typically adds to their contact list telephone numbers of family, friends, and frequent business contacts. A user would not typically add unwanted callers to their contact list. As such, contacts added by a user to the global white list 418 can be considered to be allowed contacts.

In some situations, a user may add a telephone number to their contact list and configure (e.g., set) such telephone number to be a blocked number. In an example, a blocked telephone number cannot be added to the global white list 418 by the blocking user (i.e., the user that blocked the telephone number).

In an example, the global white list 418 may include only telephone numbers. In another example, the global white list 418 may include associations between telephone numbers (or, equivalently, contacts) and the users who added the telephone numbers to the global white list 418. For example, an identity of a user (e.g., a username or a telephone number) of the user may be associated with an allowed contact or an allowed telephone number. In an example, an added count may be associated with an allowed telephone number. The added count is a count of the number of separate users who have added the allowed contact to the global white list 418.

In an example, the blocking software 410 may not consider the telephone number in the global white list 418 to be an allowed telephone number unless the added count is at least equal to a minimum added count (e.g., 3 or 5).

The blocking software 410 may allow a user to maintain (e.g., view, add, or remove) only those contacts that the user added to the global white list 418. In an example, any user can view the list of the telephone numbers included in the global white list 418. In yet another example, a user may not be able to view which other user(s) added a telephone number to the global white list 418.

The customer list 420 includes an explicit or an implicit list of customers authorized to use at least one of the telephony software 406 or the messaging software 408. The customer list 420 may be, may be included in, or may be obtained from the customer configurations 320 of FIG. 3. An explicit listing of a customer in the customer list 420 may include complete telephone numbers assigned to the customer. To illustrate, if the customer is a USA-based customer, then an explicit listing may be of the form XXX-XXX-XXXX (where each X is a digit). An implicit listing of a customer in the customer list 420 may include partial telephone numbers indicative of a group of telephone numbers. To illustrate, an implicit listing may be of the form XXX-XXX indicating that the listing covers all telephone numbers in the range XXX-XXX-0000 to XXX-XXX-9999. In another example, an implicit listing may be provided in the form of one or more ranges, such as XXX-XXX-1234 to XXX-XXX-5643.

Communications received from telephone numbers listed in the customer list 420 can be assumed to not be unwanted communications. In an example, this is so because the customers listed in the customer list 420 may be under obligations (such as contractual obligations) not to transmit unwanted communications.

The user configuration list 422 includes, for at least some users, one or more respective routing permission codes (or, simply, codes). The users may be recipients of communications. The blocking software 410 may provide facilities that a user can use to associate routing permission codes with the user. If the blocking software 410 determines that a communication directed to an intended recipient includes one of the routing permission codes associated with the intended recipient, then the blocking software 410 routes the communication to the intended recipient without challenging the recipient.

A routing permission code can be thought of as an authorization that a user grants to a sender to transmit a communication to the user. There can be many situations where it would be undesirable to block or to not route communications to a recipient from a sender (i.e., the sender itself or an entity or automated service acting on its behalf) even if the recipient is not able to successfully respond to challenges. To illustrate, a doctor's office (e.g., an automated service acting on its behalf) may transmit communications to patients to confirm appointments, a restaurant (e.g., an automated service acting on its behalf) may transmit a communication requesting confirmation of a reservation, or a school (e.g., an automated service acting on its behalf) may transmit communications to parents informing them of school closures. It is desirable for such communications to be routed to the intended recipients.

A potential recipient may provide one of the routing permission codes to the sender who may send communications or otherwise on whose behalf communications may be sent. Alternatively, a routing permission code may be provided to the potential recipient by the entity and the potential recipient enters the routing permission code in the user configuration list 422. In an example, a system associated with the sender may cause to be transmitted or may transmit a routing permission code to the software platform 402, which the blocking software 410 may add to the user configuration list 422. In an example, the blocking software 410 may associate the received routing permission code with the sender of the routing permission code.

As an example of using routing permission codes, a user may be using an on-line service (such as to sign up for the service) where the registration process may require that the user enter a verification code that the on-line service may transmit to the telephone number of the user. The user may be prompted for a routing permission code to be included in the communication that includes the verification code. The user may enter one of the routing permission codes from the user configuration list 422.

The blocking software 410 may determine whether a communication includes a routing permission code. If the communication includes such a code, then the communication is routed to the recipient without first challenging the sender. Determining whether the communication includes a routing permission code includes determining that the communication includes a routing permission code that is associated with the sender in the user configuration list 422. If the user configuration list 422 includes, for the user, at least one routing permission code associated with the sender, then the blocking software 410 determines whether the communication includes one of the at least one routing permission codes. If on the other hand, the user configuration list 422 does not include, for the user, any routing permission codes associated with the sender, then the blocking software 410 determines whether the communication includes any routing permission codes that are not associated with senders.

A routing permission code may be broadly referred to as an "indicium of the recipient." An indicium of the recipient can be any data, other than the telephone number of the recipient, included in a communication and which the blocking software 410 can use to infer that the communication is not an unwanted communication because the sender knows the data about the recipient that an unwanted sender is not likely to know. Examples of indicia of the recipient may include a first name, a last name, an address (or partial address, such as a street name) of the recipient. In an example, any data (such as a city, a state, or a zip code) that may be easily inferred from the telephone number of the recipient may not be considered indicia of the recipient. The blocking software 410 may associate a high trust level with the communication responsive to determining that the communication includes an indicium of the recipient.

In the case of a text message communication, the communication itself may include a routing permission code. As such, the blocking software 410 may scan a received text communication to determine whether the text communication includes one of the routing permission codes associated with the recipient. If the text communication includes such a code, then the communication is routed to the recipient without first challenging the sender. In the case of telephonic communications, an Interactive Voice Response (IVR) system used to initiate the communication may, upon detecting a connection with the blocking software 410, transmit the routing permission code using touch tones or utter (such as using text to speech) a message such as "My code is XXXX," where XXXX represents the code provided by the intended recipient. If the code is associated with the recipient, then the blocking software 410 may respond with a message that indicates "stand by; connecting you." In another example, the blocking software 410 may transmit a challenge that essentially states, "Do you have a code?"

The user configuration list 422 can include, for a user, user preferences (e.g., configurations or settings) that, when configured, cause the blocking software 410 to route communications to the user without challenge. Such preferences are referred to herein as "block override" preferences. In an example, the block override may include one or more time windows (e.g., time intervals or, equivalently, time spans, such as "within the next 10 minutes from now"). If a communication is received within the block override preference, then the telephone number of the communication is considered to be associated with a high trust level and the communication is routed to the user. In an example, the block override may include a flag that, when set (and until it is unset), causes communications to be considered to be associated with the high trust level and are routed without challenge to the user.

Figure 5:
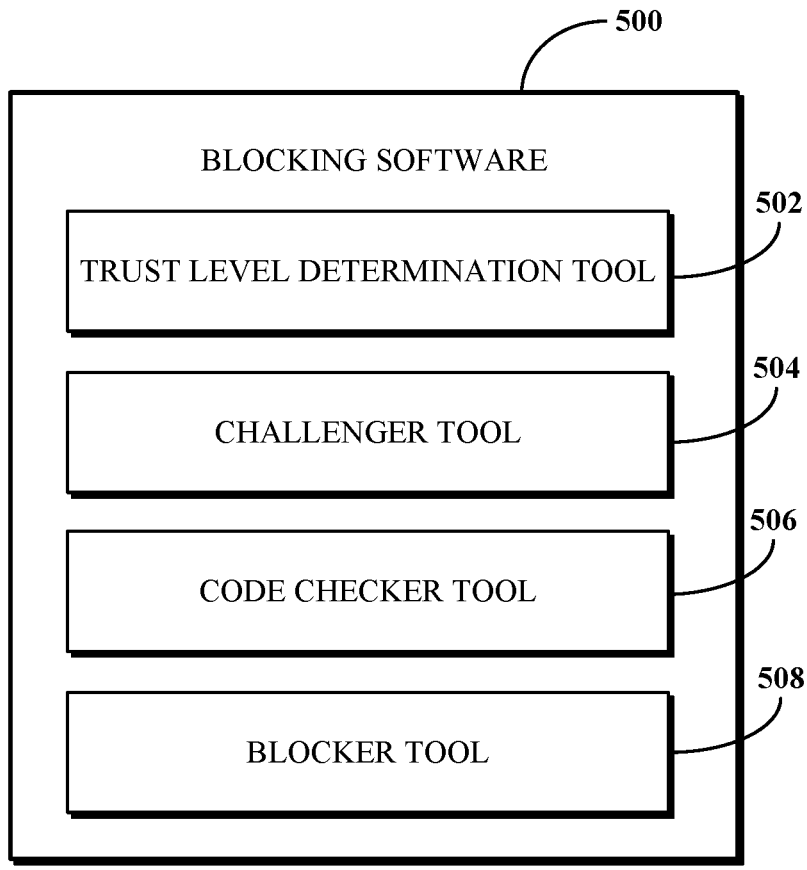
FIG. 5 is a block diagram of example functionality of blocking software.

FIG. 5 is a block diagram of example functionality of blocking software 500, which may be, for example, the blocking software 410 of FIG. 4A. The blocking software 500 includes tools, such as programs, subprograms, functions, routines, subroutines, operations, executable instructions, and/or the like for, inter alia and as further described below, blocking unwanted communications and routing communications to intended recipients. As mentioned above, blocking unwanted communications includes blocking unwanted communications over telephony services, over messaging services, or both.

At least some of the tools of the blocking software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the blocking software 500 includes a trust level determination tool 502, a challenge tool 504, a code checker tool 506, and a blocker tool 508. In some implementations, the blocking software 500 can include more or fewer tools. In some implementations, some of the tools may be combined, some of the tools may be split into more tools, or a combination thereof.

The trust level determination tool 502 identifies a trust level associated with a telephone number of a communication received from a sender. The communication may be intended for a recipient telephone number. The trust level determination tool 502 determines that the trust level is a high trust level if a block override preference is associated with the recipient telephone number. The trust level determination tool 502 may, additionally or alternatively, determine that the telephone number of the communication is associated with the high trust level if the telephone number of the communication is included in a global white list, such as described with respect to the global white list 418 of FIG. 4A. In an example, the high trust level is associated with the telephone number of the communication only if the added count associated with the telephone number of the communication is at least equal to a minimum added count.

In an example, the trust level determination tool 502 determines that the trust level is a high trust level if the telephone number of the communication is included in the customer list 420 of FIG. 4A. That the telephone number of the communication is included in the customer list 420 can mean that the software platform 402 can be considered to be a service provider for the sender of the communication. As such, the trust level can be determined to be the high trust level responsive to determining that a service provider of the telephone number of the communication is a same service provider as a telephone number of the recipient (e.g., callee) and the telephone number of the communication is verified.

In an example, the trust level determination tool 502 may obtain the trust level from the intended recipient. In an example, the trust level may be obtained from the intended recipient only if the telephone number of the communication is verified. That a telephone number is verified can include that the attestation included in the communication is one of the full attestation level or the partial attestation level. To obtain the trust level from the intended recipient, the trust level determination tool 502 may transmit a text communication descriptive of the communication to the intended recipient.

The text communication descriptive of the communication can include one or more of the telephone number of the communication, the attestation level, or the contents of the communications. To illustrate, the text communication descriptive of the communication may be "XXX-XXX-XXXX wants to send you the message <message content>. The caller ID shows as John Hancock. However, this is not a verified caller ID. Respond with 1 to receive the message, 2 to challenge the sender once, 3 to challenge the sender more than once, or 3 to ignore the message." In this case, receiving a response of 1, 2, or 3, causes the trust level determination tool 502 to associate, respectively, the high trust level, the medium trust level, or the low trust level with the telephone number of the communication.

The challenge tool 504 can transmit challenges to the sender. The challenge tool 504 determines a number of challenges to transmit to the sender (e.g., caller) based on the trust level. The challenge tool 504 determines whether to route the communication to the recipient (e.g., callee) based on whether respective successful responses to the challenges are received from the sender (e.g., within a threshold time period or over any amount of time). As mentioned, a successful response to a challenge is one that is a correct response to the challenge and is received within a response period.

In an example, if an incorrect response is received, the challenge tool 504 retransmits the challenge. The challenge tool 504 retransmits the challenge a predetermined number of times (e.g., 3 times) before the response is considered to be unsuccessful. If a response is considered unsuccessful, the challenge tool 504 does not route the communication and increments the number of unsuccessful responses (as described with respect to the number of unsuccessful responses 458 of FIG. 4). If no response is received within the response time window, the challenge tool 504 does not route the communication and increments the number of unsuccessful responses.

The code checker tool 506 can associate routing permission codes, as described above, with users. The code checker tool 506 can also be used to determine, for example, whether a text communication includes a routing permission code associated with the recipient. If the text communication includes such a code, then the trust level can be considered to be high and the text communication can be routed to the recipient. More broadly, the code checker tool 506 can determine whether a text communication includes at least one indicium of the recipient.

The blocker tool 508 can determine whether to block communications without challenging the sender. The blocker tool 508 can determine whether to block communications temporarily or permanently from a telephone number using data associated with the telephone number, such as in the do-not-allow list 416, as described above.

In an example, the blocker tool 508, another tool of the blocking software 500, and/or any other software of the software platform 402 of FIG. 4, may store, such as in the data store 404 of FIG. 4, records indicating (e.g., of or describing) received communications from senders. As such, a record indicating a (telephonic or text) communication (whether wanted or unwanted) received from a telephone number to a recipient (e.g., a callee) may be stored in the data store.

Figure 6:
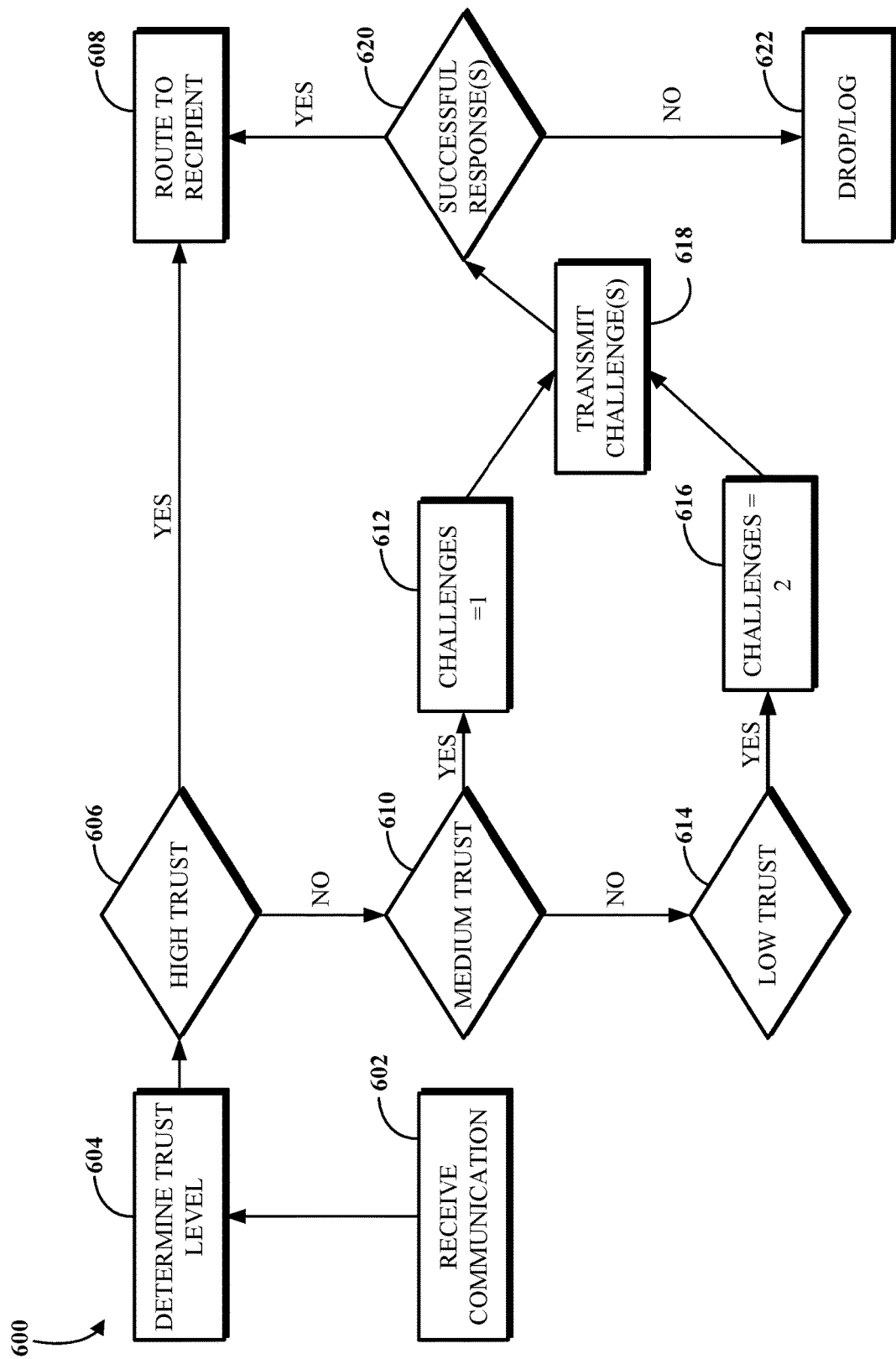
FIG. 6 is an example of a flowchart of a workflow for challenging a sender based on a trust level.

To further describe some implementations in greater detail, reference is next made to examples of techniques which may be performed for blocking unwanted communications. FIG. 6 is an example of a flowchart of a workflow 600 for challenging a sender based on a trust level. The workflow 600 can be implemented by a blocking software, such as the blocking software 410 of FIG. 4A or the blocking software 500 of FIG. 5.

At 602, a communication is received. At 604, a trust level is determined for the communication. The trust level can be determined as described with respect to the trust level determination tool 502 of FIG. 5. At 606, if the trust level is the high trust level, then the communication is routed to the recipient, at 608. The workflow 600 may determine that the trust level is the high trust level as described with respect to FIG. 7. If the trust level is not the high trust level, then the workflow 600 determines whether the trust level is the medium trust level, at 610.

If the trust level is the medium trust level, then the number of challenges to be transmitted to the sender is set to 1, at 612. From 612, the workflow 600 proceeds to 618. If the trust level is not the medium trust level, at 610, the workflow 600 determines whether the trust level is the low trust level, at 614. If the trust level is the low trust level, then the number of challenges to be transmitted to the sender is set to 2, at 616. From 616, the workflow 600 proceeds to 618.

At 618, the workflow 600 successively transmits the specified number of challenges. That is, the workflow 600 transmits one challenge and waits for a successful response. If a successful response is received, the workflow 600 transmits a next challenge, if any. As described above, if an incorrect response is received to a challenge, the challenge may be re-transmitted for a predetermined number of times. Transmitting the challenges at 618 includes waiting to receive successful responses.

At 620, if successful responses are received to the challenges, then the workflow 600 proceeds to 608 to route the communication to the recipient. If a successful response is not received for at least one of the challenges, the workflow 600 proceeds to 622. At 622, the workflow 600 ignores (e.g., does not route, drops, or disconnects) the communication. In an example, the workflow 600 may transmit a message to the sender indicating that communication was not routed to the recipient. The message may essentially state, "Your message will not be delivered" or "Your call will not be routed." In an example, at 622, the workflow 600 may also log (e.g., store) a record indicating the communication from the telephone number to the recipient, such as in the do-not-allow list 416 of FIG. 4A.

While the number of challenges is set to 1 or 2 at 612 and 616 respectively, in another example, the number of challenges to be transmitted may be obtained from the do-not-allow list 416 of FIG. 4A as described above with respect to the number of challenges 456 of FIG. 4B. As also described above, the trust level may also be obtained from the do-not-allow list 416 of FIG. 4B. In an example, the workflow 600 may increment the number of unsuccessful responses 458 of FIG. 4B for the telephone number 452 of the communication. While three trust levels are described with respect to FIG. 6, more or fewer trust levels may be available.

Figure 7:
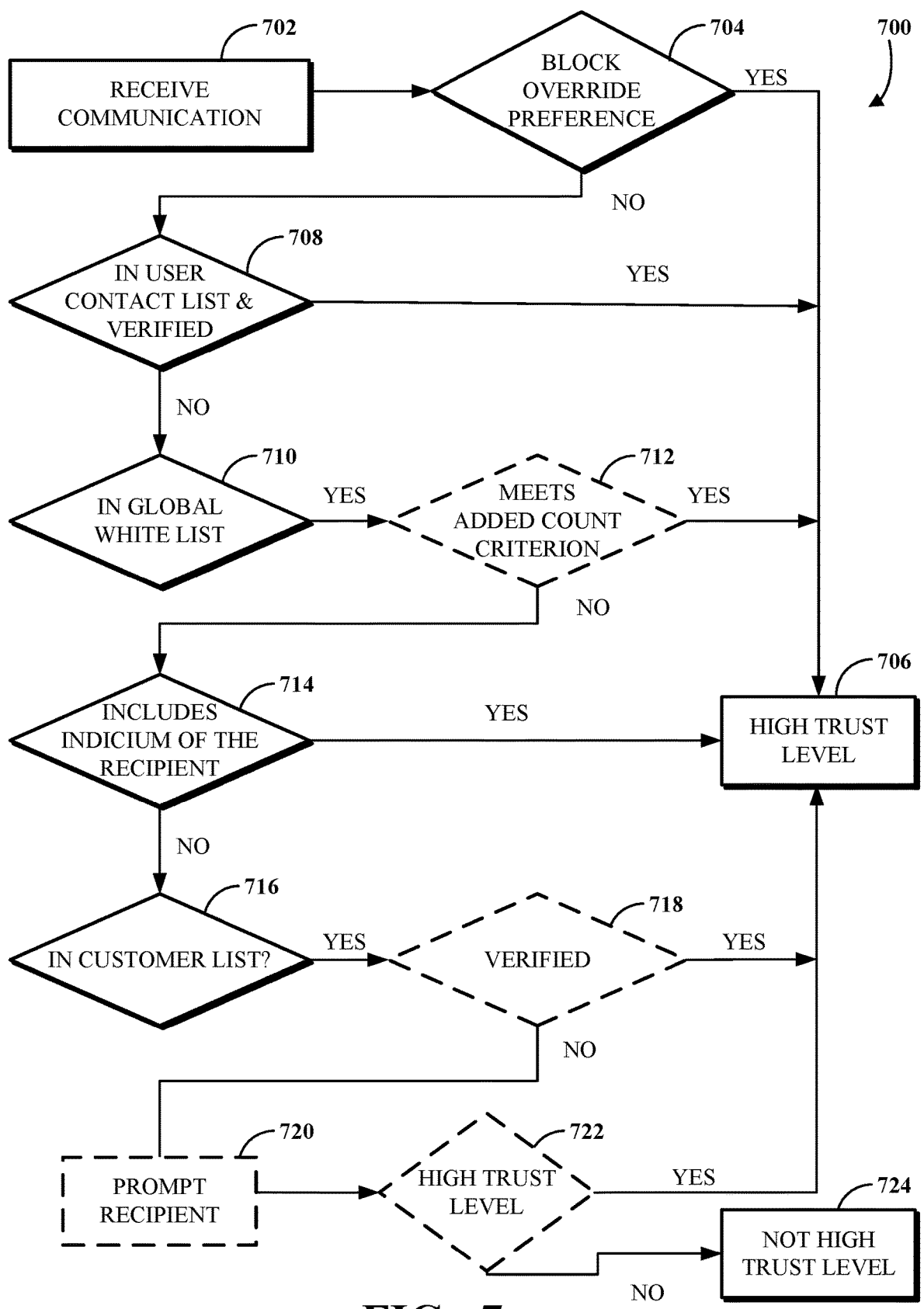
FIG. 7 is an example of a flowchart of a workflow for determining that a high trust level is associated with a communication.

FIG. 7 is an example of a flowchart of a workflow 700 for determining that a high trust level is associated with a communication. The workflow 700 can be implemented by a blocking software, such as the blocking software 410 of FIG. 4A or the blocking software 500 of FIG. 5. The workflow 700 determines that a high trust level is associated with a communication if at least one of several conditions is determined to be true with respect to the communication or the sender of the communication (i.e., the telephone number of the communication).

While several conditions are described with respect to FIG. 7, the disclosure is not limited and more, fewer, or other conditions may be evaluated to determine whether the high trust level is to be associated with a communication. Additionally, for simplicity of explanation, the workflow 700 is depicted and described as a series of steps or operations. However, the steps or operations in accordance with this disclosure can occur in various orders and/or concurrently.

At 702, a communication is received. As described above, a blocking software, such as the blocking software 410 of FIG. 4 or the blocking software 500 of FIG. 5, may receive the communication, which may be a text communication or a telephonic communication. The communication may be intended for a recipient. That is, the communication is directed to a telephone number of the recipient. At 704, the technique 704 determines whether the recipient has enabled (e.g., set or configured) a block override preference. If so, then, at 706, the high trust level can be associated with the communication; otherwise, the workflow 700 proceeds to 708.

At 708, the workflow 700 determines whether the telephone number of the communication is in the contact list of the recipient and whether the communication is verified. If so, the workflow 700 proceeds to 706; otherwise, the workflow 700 proceeds to 710. At 710, it is determined whether the telephone number of the communication is included in a global white list, such as the global white list 418 of FIG. 4. If so, in an implementation (not shown), the workflow 700 may proceed to 706; otherwise, the technique proceeds to 714. In another implementation (as shown), and as described above, if the telephone number of the communication is included in the global white list, then, at 712, the workflow 700 determines whether the telephone number of the communication meets an added count criterion. The added count criterion may be that the telephone number was added a minimum number of times to the global white list, as described above. If the telephone number of the communication meets the added count criterion, then the workflow 700 proceeds to 706; otherwise, the workflow 700 proceeds to 714.

At 714, the workflow 700 determines whether the communication includes an indicium of the recipient. In an example, the indicium of the recipient can be a routing permission code. However, other indicia of the recipient are possible, as described above. If the communication includes an indicium of the recipient, the workflow 700 proceeds to 706; otherwise, the workflow 700 proceeds to 716.

At 716, the workflow 700 determines whether the telephone number of the communication is included in a customer list, such as the customer list 420 of FIG. 4. If so, in an implementation (not shown), the workflow 700 may proceed to 706; otherwise, the technique proceeds to 720. In another implementation (as shown), and as described above, if the number of the communication is included in a customer list, the workflow 700 proceeds to 718 to determine whether the communication is verified. If the communication is verified, the workflow 700 proceeds to 706; otherwise, in an implementation, the technique may proceed to 720.

At 720, and as described above, the workflow 700 may transmit, to the recipient, a text communication descriptive of the communication. The text communication may prompt the recipient to respond with an indication of the trust level to associate with the communication. At 722, if the response from the recipient is indicative of the high trust level, then the workflow 700 proceeds to 706. Otherwise, the workflow 700 determines, at 724, that a trust level other than the high trust level is to be associated with the communication.

Figure 8:
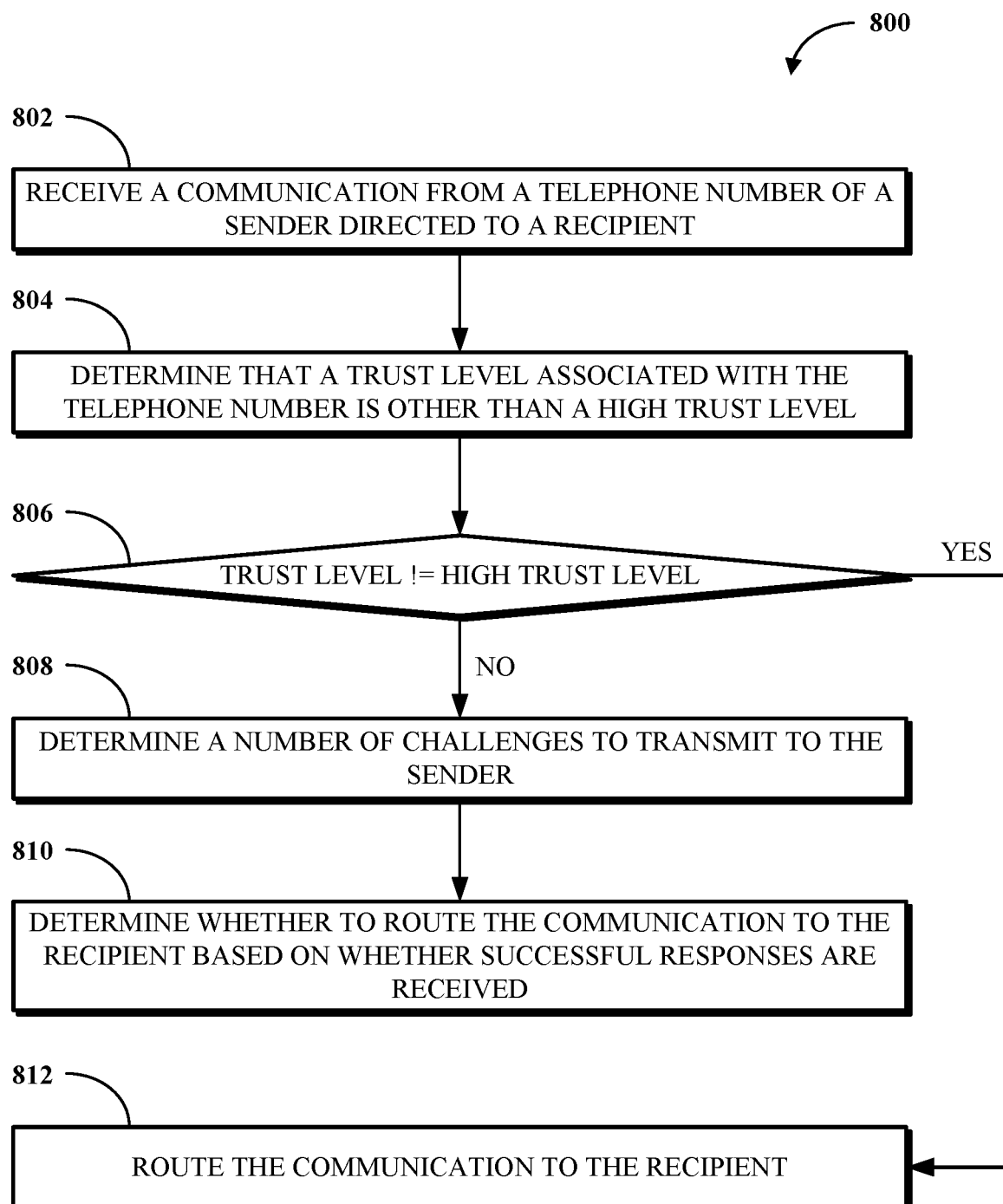
FIG. 8 is a flowchart of an example of a technique for determining whether to route a communication to an intended recipient.

FIG. 8 is a flowchart of an example of a technique 800 for determining whether to route a communication to an intended recipient. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

At 802, a communication from a telephone number of a sender is received. The communication is directed to a recipient (i.e., an intended recipient). At 804, the technique 800 determines that a trust level associated with the telephone number is other than a high trust level. That the trust level is not the high trust level may be determined as described with respect to FIG. 7.

In an example, the trust level is determined to be the high trust level responsive to a preference indicating to route communications within a time window that includes a time of receipt of the communication, as described above. In an example, the trust level is determined to be the high trust level responsive to determining that the telephone number is included in a contact list of a user other than the recipient. That the telephone number is included in a contact list of a user other than the recipient can include that the telephone number is included in a global white list, as described with respect to the global white list 418 of FIG. 4. In an example, the trust level is determined to be the high trust level responsive to determining that a service provider of the telephone number of the sender is a same service provider as a telephone number of the recipient.

In an example, determining the trust level associated with the telephone number can include determining that the telephone number is verified. Responsive to determining that the telephone number is verified, a text communication may be transmitted to the recipient indicating the communication from the telephone number. That is, the text communication transmitted to the recipient may inform the recipient that they are receiving the communication from the telephone number, as described above. The text communication may request that the recipient provide (e.g., respond with) a trust level. A response indicating the trust level to associate with the telephone number may be received from the recipient.

At 806, if the trust level is other than the high trust level, the technique 800 proceeds to 808. In an example, if the trust level is the high trust level, the technique 800 may proceed to 812 to route the communication to the recipient. At 808, a number of challenges to transmit to the sender is determined. In an example, the number of challenges may be based on the trust level. In an example, the number of challenges is 1 in a case that the trust level is a medium trust level, and the number of challenges is at least 2 in a case that the trust level is a low trust level. In an example, the number of challenges to transmit to the sender can be based on a number of unsuccessful responses associated with the telephone number of the sender.

At 810, the technique 800 determines whether to route the communication to the recipient based on whether respective successful responses to the challenges are received from the sender. In an example, a successful response to a challenge is considered to be received in a case that a correct response to the challenge is received within a response time window.

In an example, the technique 800 can further include decreasing the trust level associated with the telephone number responsive to the sender unsuccessfully responding to the challenges. A second communication may be received from the telephone number. Responsive to the sender unsuccessfully responding to challenges transmitted in response to the second communication, the telephone number can be added to a do-not-allow list. The technique 800 can further include, responsive to receiving a third communication from the telephone number where the third communication is directed to an intended recipient, determining not to route the third communication to the intended recipient based on determining that the telephone number is in the do-not-allow list. That is, a communication from a telephone number to an intended recipient may not be routed to the intended recipient responsive to determining that the telephone number is included in a do-not-allow list.

In an example, In an example, the technique 800 can further include storing a record indicating the communication from the telephone number to the recipient. In an example, if a communication is not routed to a recipient, the technique 800 transmits a message to the sender indicating that the communication was not routed to the recipient. In an example, the technique 800 blocks communications from the telephone number for a duration that is based on a number of unsuccessful responses received from the telephone number. In an example, the technique 800 may re-transmit a challenge to the sender responsive to receiving an incorrect response to the challenge from the sender. In an example, the technique 800 may permanently block communications from the telephone number, such as based on the number of unsuccessful responses.

Figure 9:
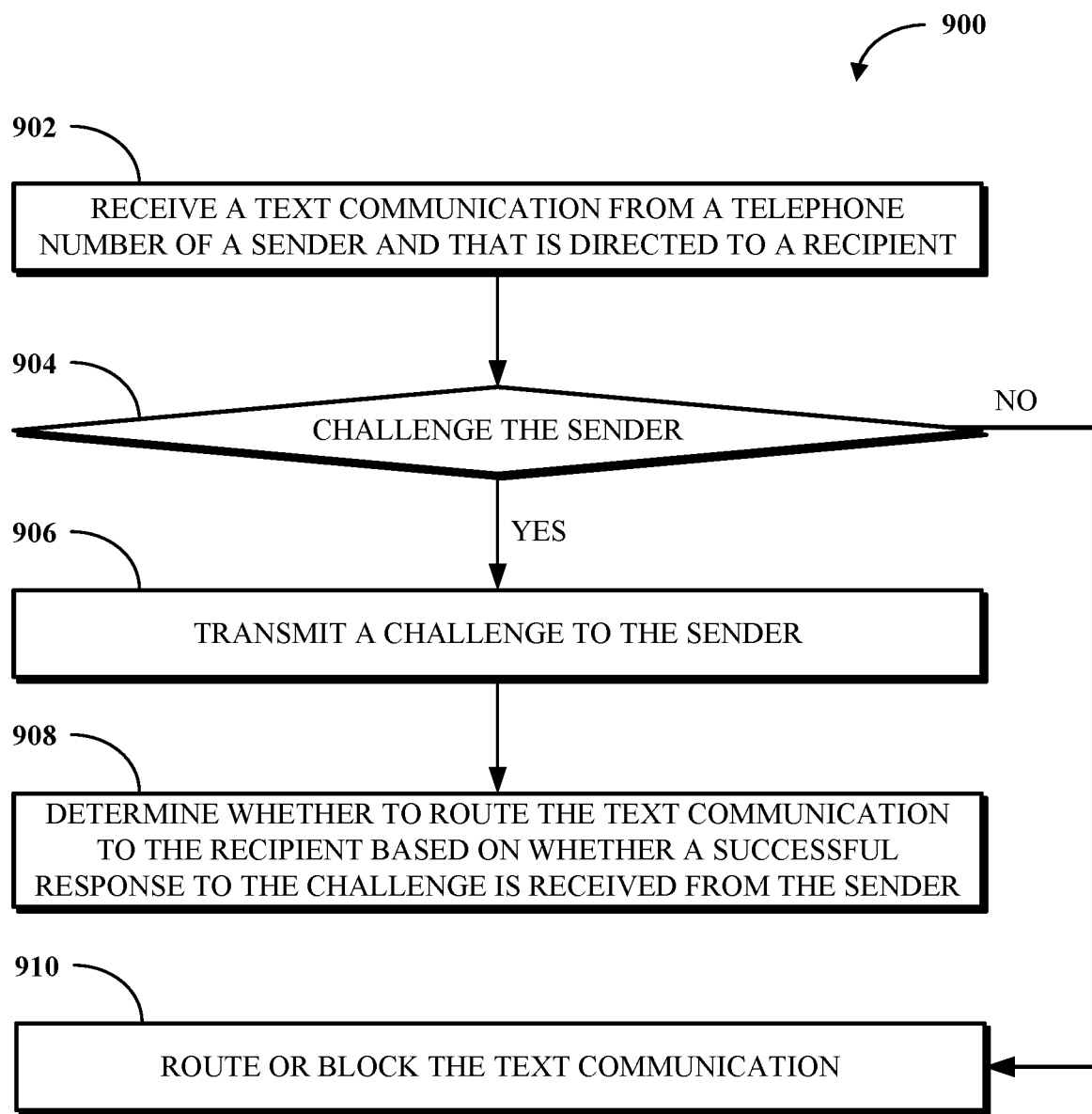
FIG. 9 is a flowchart of an example of a technique for determining whether to route a text communication to an intended recipient

FIG. 9 is a flowchart of an example of a technique 900 for determining whether to route a text communication to an intended recipient. The technique 900 can be executed using computing devices, such as the systems, hardware, and software described with respect to FIGS. 1-7. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

At 902, a text communication is received from a telephone number of a sender. The text communication is directed to (e.g., intended for) a recipient. At 904, the technique 900 determines whether to challenge the sender. If it is determined to challenge the sender, the technique 900 proceeds to 906; otherwise, the technique 900 may proceed to 910 to either route or block the text communication, as described above.

At 906, a challenge is transmitted to the sender responsive to determining to challenge the sender. In an example, determining whether to challenge the sender can include determining to challenge the sender responsive to determining that the text communication does not include a routing permission code associated with the recipient. In an example, determining whether to challenge the sender can include transmitting a communication to the recipient indicating the text communication from the telephone number and receiving from the recipient a response indicating to challenge the sender. At 908, the technique 900 determines whether to route the text communication to the recipient based on whether a successful response to the challenge is received from the sender.

In an example, the technique 900 stores a record indicating the text communication from the telephone number to the recipient. In an example, the technique 900 includes determining not to challenge the recipient responsive to determining that the telephone number is included in a global white list of telephone numbers. In an example, the technique 900 determines to route the text communication to the recipient responsive to determining that the telephone number is included in a global white list of telephone numbers. In an example, the technique 900 determines not to challenge the sender responsive to determining that the text communication includes an indicium of the recipient. In an example, the technique 900 receives a routing permission code related to the sender and stores the routing permission code in association with the telephone number. In an example, one or more routing permission codes are received from the recipient. A sender may not be challenged if a text communication received from the sender includes at least one of the one or more routing permission codes.

In an example, the technique 900 determines not to challenge the sender responsive to determining that the telephone number is included in a contact list of a user other than the recipient. In an example, a second text communication is received from the telephone number directed to an intended recipient and the technique 900 determines not to route the second text communication to the intended recipient responsive to determining that the telephone number is in a do-not-allow list.ss Some implementations herein relate to a method. For example, the method may include receiving a communication from a telephone number of a sender, where the communication is directed to a recipient; determining that a trust level associated with the telephone number is other than a high trust level; and based on the trust level being other than the high trust level: determining a number of challenges to transmit to the sender; and determining whether to route the communication to the recipient based on whether respective successful responses to the challenges are received from the s. Other embodiments of this aspect include corresponding computer systems, apparatus, and computer programs recorded on one or more computer storage devices or a computer tangible medium, each configured to perform the actions of the methods.

The described implementations may also include one or more of the following features. A successful response to a challenge may be considered to be received in a case that a correct response to the challenge is received within a response time window. The number of challenges can be 1 in a case that the trust level is a medium trust level, and the number of challenges is at least 2 in a case that the trust level is a low trust. The method may include responsive to determining that the trust level is the high trust level, routing the communication to the recipient. The method may include determining that the trust level is the high trust level responsive to a preference indicating to route communications within a time window that includes a time of receipt of the communication. The method may include determining that the trust level is the high trust level responsive to determining that the telephone number is included in a contact list of an user other than the recipient. The method may include determining that the trust level is the high trust level responsive to determining at least that a service provider of the telephone number of the sender is a same service provider as a telephone number of the recipient. The method may include, responsive to determining that the telephone number is verified, transmitting a text communication to the sender indicating the communication from the telephone number and receiving from the recipient a response indicating the trust level to associate with the telephone number.

Where the communication may be a first communication, the method may include: responsive to the sender unsuccessfully responding to the challenges, decreasing the trust level associated with the telephone number; receiving a second communication from the telephone number; responsive to the sender unsuccessfully responding to challenges transmitted in response to the second communication, adding the telephone number to a do-not-allow list; and responsive to receiving a third communication from the telephone number and directed to an intended recipient, determining not to route the third communication to the intended recipient based on determining that the telephone number is in the do-not-allow list.

The method may include determining not to route the third communication to the intended recipient based on determining that the telephone number is in the do-not-allow list. The method may include receiving a second communication from the telephone number directed to an intended recipient; and determining not to route the second communication to the intended recipient responsive to determining that the telephone number is included in a do-not-allow list. The method may include storing a record indicating the communication from the telephone number to the rec.

The described implementations may also include one or more of the following features. The number of challenges to transmit to the sender can be based on a number of unsuccessful responses associated with the telephone number of the sender. The number of challenges to transmit to the sender can be based on a number of unsuccessful responses associated with the telephone number of the sender. The method can include determining that the trust level associated with the telephone number is the high trust level responsive to determining that the telephone number is included in a global white list of contacts.

The described implementations may also include one or more of the following features. The method may include transmitting a message to the sender indicating that the communication was not routed to the recipient. The method may also include blocking communications from the telephone number for a duration that is based on a number of unsuccessful responses received from the telephone. The method may include further may include re-transmitting a challenge to the sender responsive to receiving an incorrect response to the challenge from the. The method may include permanently blocking communications from the telephone numb.

Some implementations may relate to a method that includes receiving a text communication from a telephone number of a sender, where the text communication is directed to a recipient. The method further includes determining whether to challenge the sender; and responsive to determining to challenge the sender: transmitting a challenge to the sender; and determining whether to route the text communication to the recipient based on whether a successful response to the challenge is received from the sender.

The described implementations may also include one or more of the following features. Determining whether to challenge the sender may include determining that the text communication does not include a routing permission code associated with the recipient. Determining whether to challenge the sender may include transmitting a communication to the recipient indicating the text communication from the telephone number; and receiving from the recipient a response indicating to challenge the recipient. The method may include determining not to challenge the sender responsive to determining that the text communication includes a routing permission code associated with the recipient. The method may include receiving one or more routing permission codes from the recipient, where the sender is not challenged if the text communication includes at least one of the one or more routing permission. The sender may not be challenged if the text communication includes at least one of the one or more routing permission codes.

The method may include determining not to challenge the sender responsive to determining that the telephone number is included in a contact list of an user other than the recipient. The method may include receiving a second text communication from the telephone number directed to an intended recipient; and determining not to route the second text communication to the intended recipient responsive to determining that the telephone number is in a do-not-allow list. The method may include storing a record indicating the text communication from the telephone number to the recipient. The method may include determining not to challenge the recipient responsive to determining that the telephone number is included in a global white list of telephone numbers. The method may include determining to route the text communication to the recipient responsive to determining that the telephone number is included in a global white list of telephone numbers.

The method may include determining not to challenge the sender responsive to determining that the text communication includes an indicium of the recipient. The method may include receiving a routing permission code related to the sender; and storing the routing permission code in association with the telephone. Determining to challenge the sender may include receiving from the recipient an indication to challenge the sender. Determining whether to challenge the sender may include: determining to challenge the sender responsive to determining that the text communication does not include an indicium of the recipient. The method may include, responsive to determining not to challenge the sender, routing the text communication to the recipient. The method may include, responsive to determining that the telephone number is blocked, dropping the text communication. The method may include blocking communications from the telephone number for a duration that is based on a number of unsuccessful responses received from the telephone number.

For simplicity of explanation, the techniques 600-900 of FIGS. 6-9, respectively, are each depicted and described herein as a respective series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   receiving a communication from a telephone number of a sender, wherein the communication is directed to a recipient;
   transmitting a text communication to the recipient indicating the communication from the telephone number,
   receiving from the recipient a response indicating a trust level to associate with the telephone number,
   determining that the trust level associated with the telephone number is other than a high trust level; and
   based on the trust level being other than the high trust level;
      determining a number of challenges to transmit to the sender; and
      determining whether to route the communication to the recipient based on whether respective successful responses to the challenges are received from the sender.

2. The method of claim 1, wherein a successful response to a challenge is received in a case that a correct response to the challenge is received within a response time window.

3. The method of claim 1, wherein the number of challenges is 1 in a case that the trust level is a medium trust level, and wherein the number of challenges is at least 2 in a case that the trust level is a low trust level.

4. The method of claim 1, further comprising:
   responsive to determining that the trust level is the high trust level, routing the communication to the recipient.

5. The method of claim 1, further comprising:
   determining that the trust level is the high trust level responsive to determining that the telephone number is included in a contact list of a user other than the recipient.

6. The method of claim 1, wherein further comprising:
   determining that the trust level is the high trust level responsive to determining at least that a service provider of the telephone number of the sender is a same service provider as a telephone number of the recipient.

7. The method of claim 1, wherein the text communication is transmitted to the recipient responsive to determining that the telephone number is verified.

8. The method of claim 1, wherein the communication is a first communication, further comprising:
   responsive to the sender unsuccessfully responding to the challenges, decreasing the trust level associated with the telephone number;
   receiving a second communication from the telephone number;
   responsive to the sender unsuccessfully responding to challenges transmitted in response to the second communication, adding the telephone number to a do-not-allow list; and
   responsive to receiving a third communication from the telephone number and directed to an intended recipient, determining not to route the third communication to the intended recipient based on determining that the telephone number is in the do-not-allow list.

9. The method of claim 1, wherein the high trust level is associated with the communication based on a preference indicating to route communications to the recipient within a time window.

10. The method of claim 1, further comprising:
    storing a record indicating the communication from the telephone number to the recipient.

11. A device, comprising:
    a memory; and
    a processor, the processor configured to execute instructions stored in the memory to:
       receive a communication from a telephone number of a sender, wherein the communication is directed to a recipient;
       transmit a text communication to the recipient indicating the communication from the telephone number;
       receive from the recipient a response indicating a trust level to associate with the telephone number;
       determine that the trust level associated with the telephone number is other than a high trust level; and
       based on the trust level being other than the high trust level:
          determine a number of challenges to transmit to the sender; and
          determine whether to route the communication to the recipient based on whether respective successful responses to the challenges are received from the sender.

12. The device of claim 11, wherein the processor is further configured to execute instructions stored in the memory to:
    transmit the text communication to the recipient responsive to determining that the telephone number is verified.

13. The device of claim 11, wherein the number of challenges to transmit to the sender is based on a number of unsuccessful responses associated with the telephone number of the sender.

14. The device of claim 11, wherein the processor is further configured to execute instructions stored in the memory to:
    determine that the trust level associated with the telephone number is the high trust level responsive to determining that the telephone number is included in a global white list of contacts.

15. A non-transitory computer readable medium storing instructions operable to cause one or more processors to perform operations comprising:
    receiving a communication from a telephone number of a sender, wherein the communication is directed to a recipient;
    transmitting a text communication to the recipient indicating the communication from the telephone number,
    receiving from the recipient a response indicating a trust level to associate with the telephone number,
    determining that the trust level associated with the telephone number is other than a high trust level; and
    based on the trust level being other than the high trust level:
       determining a number of challenges to transmit to the sender; and
       determining whether to route the communication to the recipient based on whether respective successful responses to the challenges are received from the sender.

16. The non-transitory computer readable medium of claim 15, wherein the operations further comprise:

transmitting a message to the sender indicating that the communication was not routed to the recipient.

17. The non-transitory computer readable medium of claim 15, wherein the operations further comprise:
blocking communications from the telephone number for a duration that is based on a number of unsuccessful responses received from the telephone number.

18. The non-transitory computer readable medium of claim 15, wherein the operations further comprise:
re-transmitting a challenge to the sender responsive to receiving an incorrect response to the challenge from the sender.

19. The non-transitory computer readable medium of claim 15, wherein the operations further comprise:
permanently blocking communications from the telephone number.

20. The non-transitory computer readable medium of claim 15, wherein the high trust level is associated with the communication based on a preference indicating to route communications to the recipient within a time window.

* * * * *